Jan. 14, 1964     J. J. ALTHERR     3,117,653

BRAKE MECHANISM FOR TELESCOPING CARTS

Filed Dec. 18, 1961

INVENTOR
JACOB J. ALTHERR
BY

ATTORNEY

3,117,653
BRAKE MECHANISM FOR TELESCOPING CARTS
Jacob J. Altherr, 8213 Fendale, Affton, Mo.
Filed Dec. 18, 1961, Ser. No. 159,887
3 Claims. (Cl. 188—29)

This invention relates in general to the design and provision of brake facilities for telescoping carts and more particularly to that variety of such carts as is used in grocery stores and like places for carry-out activity.

It is customary for such retail stores to allow customers to use conventional telescoping grocery carts both inside the store and to carry and transport parcels from the store checkout counter to the customer's car, which is generally parked outside at some distance, either on the store parking lot or on the street.

Usually these telescoping carts are not provided with brakes, so that no provision has been made to lock the cart wheels to prevent it from rolling. Usually the parking lots have been graded at a slight inclination from the horizontal so that rain waters will drain off. This condition results in making it difficult to prevent the cart from rolling unless it is held. During the transfer of packages from the cart to the automobile on the lot, one's hands are of necessity engaged with the packages and the cart therefore rolls on the graded incline.

A principal object of this invention is to provide a simple foolproof brake mechanism which is positive in actuation and effective under all conditions.

Another object of this invention is to provide a mechanism which can be readily applied to all the various types of conventional telescoping carts commonly used in grocery stores and the like at the present time as well as to any new types.

An additional object of this invention is to provide a brake mechanism which will not interfere in any way with the telescoping of such carts, as well as not being actuated by said telescoping.

A further object of this invention is to provide a brake mechanism which is entirely contained within the space between the rear legs of the telescoping carts so that it does not project on the sides to interfere with the passage of other carts or project on the sides to knock against the legs of other persons or other carts.

A still further object of this invention is to provide a brake mechanism in which the braking and locking action is obtained entirely by use of the foot, being both applied, locked, and released by the use of one foot, in fact either foot, so that it is operable from either side of the cart with one foot.

An additional object of this invention is to provide a brake mechanism for telescoping carts which offers positive locked braking to the two rear wheels of the cart simultaneously so that the cart cannot be moved and cannot be able to roll of its own accord when placed on an incline with the brakes locked.

These and other objects of the invention will more clearly appear to those skilled in the art by reference to the accompanying drawings forming a part of the present specification, wherein like characters of reference designate corresponding parts throughout the several views, in which.

Figure 1:
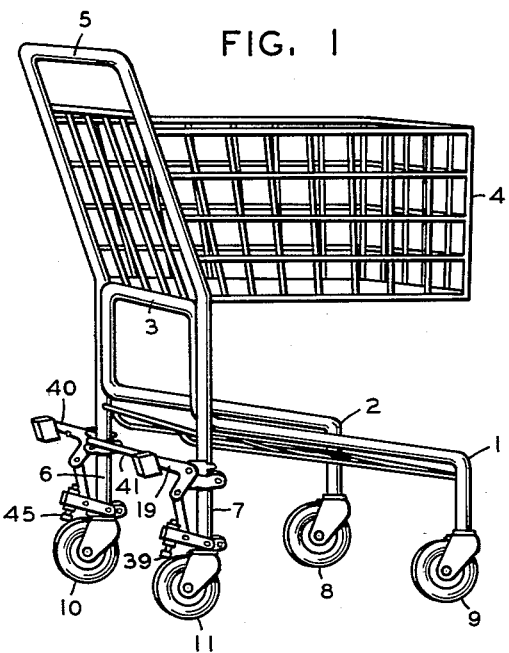
FIG. 1 is a perspective view of a telescoping cart showing the present invention attached.

In the illustration of FIG. 1 the cart is shown to be the telescoping carry-out cart type, embodying the lower frame of general U-shape including the side arms 1 and 2 and the cross bar 3. The basket 4 is of conventional type and the handle 5 is formed of a U-shaped member which terminates in legs 6 and 7. The four wheels are all of the caster-type and the front ones are numbered 8 and 9, the rear ones 10 and 11.

Figure 2:
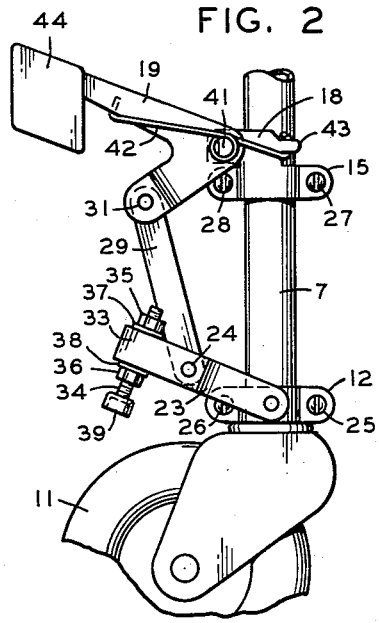
FIG. 2 is a detail view of the right rear wheel brake mechanism in the released position.
Figure 4:
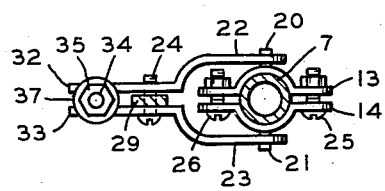
FIG. 4 is a section taken on the line 4—4 of FIG. 3.
Figure 5:
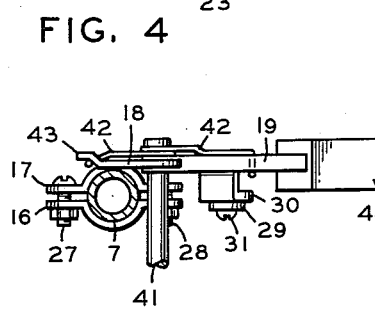
FIG. 5 is a view of the top of FIG. 2 showing the relationship of the upper elements of the brake mechanism.

The two rear wheels have mounted above them on their corresponding legs the braking mechanisms. In FIG. 2 the brake mechanism is shown in more detail. The mechanism is attached or mounted on the leg 7 by means of split brackets, the lower split bracket 12, formed of the two U-shaped members 13 and 14 of FIG. 4, and the upper split bracket 15, formed of the two U-shaped members 16 and 17 of FIG. 5.

One side of the upper split bracket 15 is provided with a pivot plate 18, integral with the side, that is 17. Pivoted upon the pivot plate 18 is the brake pedal 19.

Both sides of the lower split bracket 12 carry pivot pins, 20 and 21. Riding on the pivot pins 20 and 21 is the split yoke bracket formed of the bent members 22 and 23. The bent members 22 and 23 are held together by the bolt 24. The members 13 and 14 are held together by the bolts 25 and 26; whereas the members 16 and 17 are held together by the bolts, 27 and 28.

The brake actuating lever 29 is pivoted at both ends. At the upper end it is pivoted to the brake pedal leg 30 upon the bolt 31, upon which it freely pivots. At the lower end it is pivoted to the bolt 24 upon which it freely pivots.

At the rearward ends the members 22 and 23 terminate in the legs 32 and 33. Passing between and held by these legs is the adjustable brake element which contacts the wheel. This element consists of a bolt 34 which is positioned by means of two nuts 35 and 36, and two washers 37 and 38. I prefer to have the wheel-contacting end of the bolt 34 consist of a cup member 39, having a relatively thin edge at the wheel contacting portion, which enables the cup member to be able to be embedded as shown in FIG. 3.

There is a similar brake pedal 40 on the left rear leg 6 of the cart of FIG. 1. Extending between the two brake pedals 40 and 19 and integral with them is the shaft 41, which is shown in its extended form in FIG. 1 and FIG. 5, whereas only the end of 41 shows in FIGS. 2 and 3. I provide a pedal return spring which is shown as numeral 42, to curl under the pedal 19, then around the shaft 41 and then under the boss or projection 43 on the pivot plate 18. Also I provide a rubber covering 44 for the pedal 19.

In the released or retracted position of FIG. 2, the cup member 39 is held away from the rubber wheel 11, through the action of the return spring 42, which pulls upward on the pedal 19 and thereby exerts a force on the upper end of the brake actuating lever 29. This force pulls the lower end at pivot bolt 24 upward and carries the bent members 22 and 23 of the split yoke bracket upward. Since they are pivoted upon the pivot pins 20 and 21, the end carrying the bolt 34 and the disc-like cup member 39 are held away from the rubber wheel 11.

Figure 3:
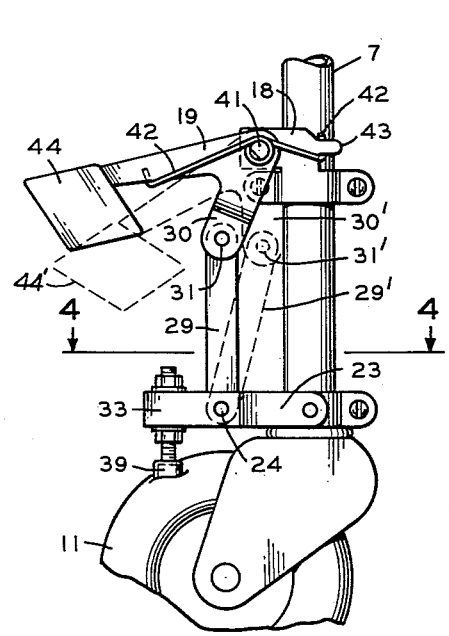
FIG. 3 is a detail view of the brake mechanism of FIG. 2 in the locked brake position.

To actuate the brake and lock it requires two steps which are best shown in FIG. 3. In the first step, the brake pedal 19 is depressed by stepping upon the rubber covering 44. The effect of this action is to move the brake pedal leg 30 downward in the illustration. This forces the bolt 31 and the lever 29 downward, resulting in forcing the bolt 24 to be moved downward, and forcing the split yoke bracket bent members 22 and 23 downward. This also forces the cup member 39 against and depressed or embedded into the tire or rubber wheel 11 as shown in FIG. 3.

To lock the brakes, or to lock the cup member in its embedded position in the wheel 11, the pedal covering 44 is depressed or forced downward further as shown by the dotted line position in FIG. 3 as 44'. The pedal leg 30 thus moves to its dotted line position 30' and the brake actuating lever 29 to its dotted line position 29'. The position at which the brake begins to lock is that position in which the centers of the shaft 41, the bolt 31 and the bolt 24 line in a straight line. When bolt 31 has been moved past that straight line to the dotted line position 31' the brake is locked and the cup member 39 is firmly locked in its embedded position and the wheel 11 cannot be turned.

At the same time the movement downward of the pedal 19 has rotated the integral shaft 41 and rotated the pedal 40 downward similarly in FIG. 1. Thus foot pressure upon either pedal 19 or 40 rotates the shaft 41 and moves the other pedal downward. This results in the actuating of a similar set of elements on the other rear leg of the cart and results in embedding the other cup member 45 in the wheel 10.

To release the braking mechanisms, either the pedal 19 or the pedal 40 is pulled or kicked upward with the foot. The shaft 41 is rotated clockwise in FIG. 1. Bolt 31 moves from the dotted position 31' to 31 and the leg 30 moves clockwise around the shaft 41. Continuing this movement raises the bent members 22 and 23 of the split yoke bracket upward, carrying the cup member 39 upward to the position of release shown in FIG. 2.

By the use of the two nuts 35, 36 and the bolt 34 for carrying the cup member 39 I have made the position of the cup member adjustable in the vertical sense. This is a necessary adjustment because of the varying degrees of wear on the various wheels of a given lot of carts. The cup member 39 must not be driven in so deeply into the rubber wheel that it will damage the rubber, however it must be forced in far enough to exert a full braking action. Actually there is an interaction between the wheel and the cup member which provides the locking. The cup member goes furtherest into the wheel when the centers of the shaft 41, the bolt 31 and the bolt 24 fall upon a straight line. Further depression of the pedal 40 or 19 carries 31 to 31', and the pressure of the wheel 11 against the cup member 39 raises the cup member and the lever 29 slightly to provide the locked effect.

It will be noted therefore that once the brake pedal 19 or 40 has been raised past the locking position, that is again the position in which the centers of the shaft 41, the bolt 31 and the bolt 24 fall upon a straight line, by raising the pedal with the foot, the brake is released from the position of furtherest penetration of the cup member 39 into the wheel. In the releasing of the brakes, the two return springs, one upon each brake pedal complete the releasing action and return the pedals to the upraised condition of FIG. 2.

It will also be noted that the brackets and brake pedals are all arranged so that they do not project sidewise of the carts. The purpose of this is to be certain that there is no possibility of injury to persons walking past the cart as well as preventing one cart from interfering with the passage of another in the crowded aisles of grocery stores.

Although I have herein shown and described only one form of a brake mechanism embodying my invention, it is to be understood that various changes and modifications may be made therein within the scope of the appended claims without departing from the spirit and scope of my invention.

Having thus described my invention, what I claim is:

1. In a telescoping cart having a frame, a basket carried by the frame and two front and two rear legs provided with wheels having a rubber surface, an upper split bracket and a lower split bracket on each of said rear legs, said upper and lower split brackets each being formed of two U-shaped members, a pivot plate on each rear leg integral with said upper bracket, a pair of pivot pins on each lower split bracket, one on each member of said lower bracket, a split yoke bracket pivotedly mounted on the pair of pivot pins on the lower split bracket, two brake pedals and integral legs pivotally mounted one on each pivot plate, a common shaft for said brake pedals integral with said pedals and extending through said pivot plates, and upon the center line of which shaft said pedals pivot, a pivot bolt on each split yoke bracket, a brake actuating lever pivoted at its lower end to said pivot bolt on the split yoke bracket and pivoted at its upper end to a pivot on the leg of said brake pedal, and a cup member mounted adjustably on each split yoke bracket to engage the rubber surface of the wheel.

2. In a telescoping cart having a frame, a basket carried by the frame and two front and two rear legs provided with wheels having a rubber surface, an upper split bracket and a lower split bracket on each of said rear legs, each split bracket being formed from two U-shaped members held together around the associated leg of said cart by a pair of bolts, a pivot plate on each rear leg integral with one member of said upper split bracket, a pair of pivot pins on each lower split bracket, one on each member of said lower bracket, a split yoke bracket formed of two bent members pivoted on the pair of pivot pins on the lower split bracket, two brake pedals and integral legs pivotally mounted one on each pivot plate, a pivot on each pedal leg, a common shaft for said brake pedals integral with said pedals and extending through said pivot plates to form the pivot axis around which said brake pedals pivot, a boss on each pivot plate and a return spring secured to said boss and curled around said shaft and under said brake pedal, a pivot bolt on the split yoke bracket, a brake actuating lever pivoted at its lower end to said pivot bolt on each split yoke bracket, said brake actuating lever pivoted at its upper end to the pivot on the leg of said brake pedal, and a cup member mounted adjustably in the vertical sense on each said split yoke bracket at the end of the bracket near the wheel to engage the rubber surface of the wheel.

3. In a telescoping cart having a frame, a basket carried by the frame and two front and two rear legs provided with wheels having a rubber surface, an upper split bracket and a lower split bracket on one of said rear legs, said upper and lower split brackets each being formed of two U-shaped members held together around the associated leg of said cart by a pair of bolts, a pivot plate on said rear leg integral with said upper bracket, a pair of pivot pins on the lower split bracket, one on each member of the lower bracket, a split yoke bracket pivotedly mounted on the pair of pivot pins on the lower split bracket, a brake pedal and integral leg pivotally mounted on the pivot plate, a shaft for said brake pedal integral with said pedal and extending through said pivot plate, to form the axis around which said brake pedals pivot, a pivot on the leg of said brake pedal, a pivot bolt on the split yoke bracket, a brake actuating lever pivoted at its lower end to said pivot bolt on the split yoke bracket and pivoted at its upper end to the pivot on the leg of the brake pedal, and a wheel-locking member mounted adjustably on the split yoke bracket to engage the rubber surface of the wheel upon actuation of the brake pedal through the brake actuating lever.

References Cited in the file of this patent

UNITED STATES PATENTS

| | | |
|---|---|---|
| 506,504 | Hollis | Oct. 10, 1893 |
| 2,591,524 | Douglas et al. | Apr. 1, 1952 |
| 2,738,034 | Levine | Mar. 13, 1956 |
| 2,884,803 | Willis | May 5, 1959 |
| 2,950,121 | Fisher | Aug. 23, 1960 |

FOREIGN PATENTS

| | | |
|---|---|---|
| 416,989 | Great Britain | Sept. 26, 1934 |
| 760,221 | France | Dec. 6, 1933 |